Dec. 15, 1925.
M. O. SUTTER
SHADE
Filed April 16, 1923
1,565,973
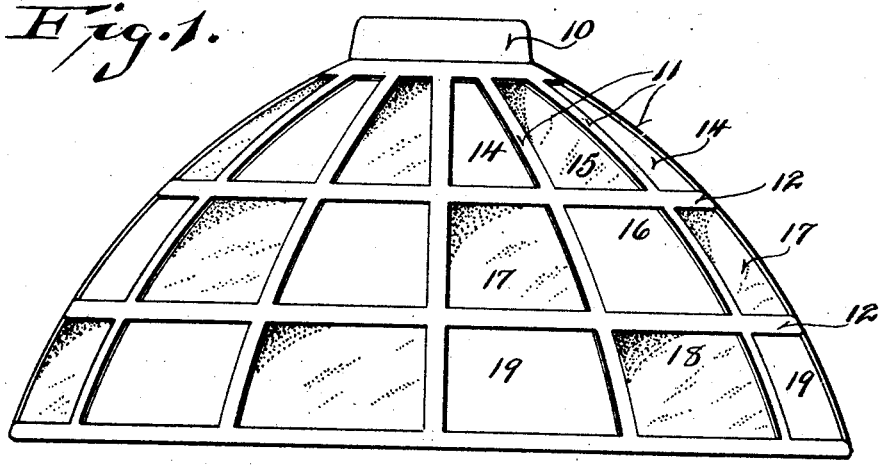
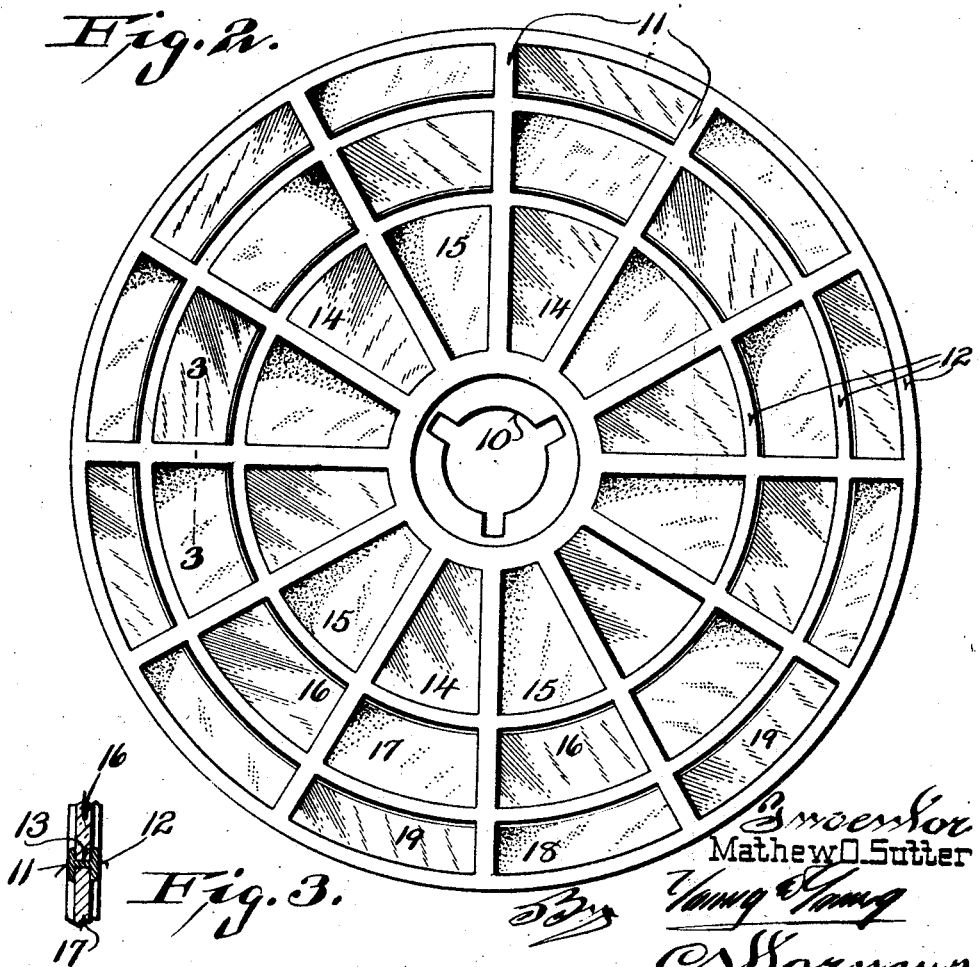
Inventor
Mathew O. Sutter Patented Dec. 15, 1925.

1,565,973

UNITED STATES PATENT OFFICE.

MATHEW O. SUTTER, OF MILWAUKEE, WISCONSIN.

SHADE.

Application filed April 16, 1923. Serial No. 632,385.

*To all whom it may concern:*

Be it known that I, MATHEW O. SUTTER, a citizen of the United States, and resident of Milwaukee, in the county of Milwaukee and State of Wisconsin, have invented certain new and useful Improvements in Shades; and I do hereby declare that the following is a full, clear, and exact description thereof.

The invention relates to improvements in shades or reflectors for lamps and while more especially adapted for use in connection with electric lamps, its use of course is not limited thereto but it may be employed wherever a device of this general character is required.

It comprises alternate translucent panels and mirror panels, the mirrors having their reflecting surfaces inwardly directed. The panels are supported in a checkerboardlike arrangement, the edges of a panel of one kind being bordered immediately by panels of the other kind.

The primary object of the invention is the production of a shade which will direct a stream of light so as to provide strong illumination in one direction and thus to brighten a particular area, and it is also operative to diffuse a part of the light generally so that the illumination will not be limited entirely to one place.

The translucent panels prevent the bright rays of light from striking immediately upon the eye. Again, the bright rays of light directed outwardly by the mirrors are not contrasted with an absolute darkness, but the rays diffused by the translucent panels make the contrast less sharp, so that no eye-strain will result. By the checkerboard arrangement the light is diffused in all directions. The arrangement of the mirrors is such, also, as reflects and directs outwardly in a stream a considerable portion of the light energy.

An additional object of the invention is the provision of a strong frame structure securely retaining the panels, simple in construction, easy to manufacture and durable.

With the above and other objects in view, which will appear as the description proceeds, the invention resides in the novel construction, combination and arrangement of parts substantially as hereinafter described and more particularly defined by the appended claim, it being understood that such changes in the precise embodiment of the herein disclosed invention may be made as come within the scope of the claim.

In the accompanying drawing is illustrated one complete example of the physical embodiment of the present invention constructed according to the best mode so far devised for the practical application of the principles thereof.

Figure 1 is a side elevation of the novel shade.

Figure 2 is a bottom plan thereof.

Figure 3 is a detail in section, showing the manner of support of the panels.

The shade is somewhat globular in shape. From a ferrule 10, which may be used for supporting purposes, a series of ribs 11 are outwardly directed, the ribs appearing radially as viewed in plan, but being bowed as viewed in elevation, so as to conform to a substantially globular imaginary surface. The ribs 11 are rigid with the ferrule and intersecting horizontal rings 12, with which they also are rigid. The ribs and rings are similar in appearance in cross section, being substantially of the shape of the letter H, a web 13 being provided, extending between a pair of gripping strips. Adjacent ferrule 10 are a series of mirror panels 14, each of the panels being received in grooves in the ribs immediately adjacent thereto. The innermost of the rings 12 also receives the edge of these panels so that they are immovably supported. These panels are spaced apart, and alternately disposed among them are a series of trapezoidal translucent panels 15; beyond the innermost ring 12 is a second series of mirror panels 16; these panels are disposed outwardly radially with respect to the translucent panels 15. Among the mirror panels 16 are translucent panels 17 alternately arranged. Each of the translucent panels 17 is outwardly disposed radially, as viewed in plan, with respect to a mirror panel 14. Exteriorly of and adjacent the mirror panels 16 are translucent panels 18, and exteriorly of and adjacent to translucent panels 17 are mirror panels 19. In other words, the arrangement of panels is such that a panel of one kind is bordered immediately along its edges by panels of the other kind, so that a checkerboardlike arrangement results.

Each of the panels is rigidly secured in position, as it is bordered on all sides by a frame formed by the ribs 11 and the rings 12. Each panel is received in grooves in the ribs and rings. If the shade is supported in such a position as to appear as shown in side elevation in Figure 1, the reflecting surfaces of the mirrors which are inwardly disposed will direct downwardly and outwardly a stream of light from the source of illumination. Thus the shade will be operative to brighten a particular area. The translucent panels in the shade are operative, however, to direct light outwardly, so that a general illumination results. Light is diffused in all directions. As the translucent panels are on all sides of the source of light, a distribution of light in all directions results. If the shade were made up only of the mirrors, the light would be directed outwardly in a bright stream and the contrast of the light with a very dark background would produce eye-strain. The translucent panels result in such a diffusion of light that there is not sufficient contrast between the stream of bright light and the background to fatigue the eye. A large part of the light energy is directed downwardly by the mirrors, which are disposed on all sides of the source of illumination.

The shade is simple in construction, easy to manufacture, and strong, and the checkerboardlike arrangement is ornamental and pleasing to the eye.

I claim:

A lamp shade comprising a frame made up of rings and intersecting radial ribs, and a plurality of mirror panels and translucent panels carried between said ribs and rings and arranged in a checkerboard manner with the mirror panels both circumferentially and radially alternating with the translucent panels, said mirror panels having their reflecting sides directed inwardly of the shade.

In testimony that I claim the foregoing I have hereunto set my hand at Milwaukee, in the county of Milwaukee and State of Wisconsin.

MATHEW O. SUTTER.